United States Patent [19]
Sprague

[11] 3,746,238
[45] July 17, 1973

[54] WELDING AND CUTTING APPARATUS

[75] Inventor: Robert E. Sprague, Chagrin Falls, Ohio

[73] Assignee: The F. C. Thornton Co., Cleveland, Ohio

[22] Filed: Oct. 5, 1971

[21] Appl. No.: 186,644

[52] U.S. Cl............................ 228/9, 29/477, 72/168, 228/13, 228/15, 228/17
[51] Int. Cl............................................... B23k 5/00
[58] Field of Search.................... 228/4, 5, 8, 9, 10, 228/45, 47, 49, 13, 15, 17; 29/477, 477.7; 219/155; 72/167, 168; 10/73, 74

[56] References Cited
UNITED STATES PATENTS

| | | | |
|---|---|---|---|
| 3,251,978 | 5/1966 | Smith.................................. | 228/5 X |
| 2,309,963 | 2/1943 | Krueger............................. | 72/168 X |
| 2,264,507 | 12/1941 | Burger................................ | 72/168 |
| 2,193,661 | 3/1940 | Young................................ | 10/74 X |
| 1,984,873 | 12/1934 | Fullman............................. | 10/74 X |
| 1,771,955 | 7/1930 | Fork et al.......................... | 72/168 X |

Primary Examiner—J. Spencer Overholser
Assistant Examiner—Robert J. Craig
Attorney—Fay, Sharpe and Mulholland

[57] ABSTRACT

The specification and drawings disclose an improved cutting and welding apparatus particularly suited for forming metal closure bands of the type used on shipping drums and the like. The apparatus shown comprises a forming unit adapted to take a flat metal band and form it into a ring having a generally U-shaped cross-section. The forming assembly includes cooperating rolls which are shaped and positioned to simultaneously form the cross-section and deflect the band into the required circular configuration. Associated with the forming means is an assembly which includes a pair of welding heads positioned to engage the formed band at closely spaced points and a cutting member which is positioned between the welding heads and adapted to sever the band following a welding operation. The welding heads are mounted for reciprocation and include means responsive to movement of the band for actuating the heads. The means for controlling the unit include sensors which stop the forming operation at a precise point so that actuation of the cutting and welding heads is closely controlled and takes place at a single work station. The drawings also disclose feed means for feeding end connector members to the welding and cutting station for positioning on the ends of the bands immediately prior to the welding operation which joins them to the band. The feeding means comprise simple reciprocated feeders which feed the connector members from a gravity-type feed slide.

6 Claims, 10 Drawing Figures

Patented July 17, 1973

INVENTOR.
ROBERT E. SPRAGUE
BY
Fay, Sharpe & Mulholland
ATTORNEYS

INVENTOR.
ROBERT E. SPRAGUE

INVENTOR.
ROBERT E. SPRAGUE
BY
Fay, Sharpe & Mulholland
ATTORNEYS

WELDING AND CUTTING APPARATUS

The subject invention is directed toward the art of metal forming and, more particularly, to an improved apparatus for performing a combined welding and cutting operation.

The invention is especially suited for use in a machine for forming drum closure rings and will be described with particular reference thereto; however, it will be appreciated the invention is capable of broader application and can be used in many different environments for forming many types of components.

Closure rings for shipping drums and the like are generally formed from a continuous, flat, narrow metal band. The band is normally passed through forming rolls to give it a desired cross-section which is typically U-shaped. The rolls simultaneously curve the U-shaped band into a circular configuration to engage the top of a drum. After being formed to the curcular configuration, the band is cut to length so that the resulting piece is circular with generally abutting ends.

Manually releasable connecting members are joined to the abutting ends so that they can be locked together when affixed to a drum. Typically, the connecting members have been joined to the ring by welding or riveting in a separate machine subsequent to the forming operation.

The present invention provides a combined cutting and welding assembly which permits both the cutting and welding operations to be accomplished at a single station in the forming machine. This eliminates at least one indexing operation and simplifies operation and control of the machine. Further, because the welding and cutting take place at the same station, there are fewer problems in properly locating the connecting members relative to the ends.

Prior to the subject invention, the closure bands were often formed on a first machine which deformed the metal strip to the desired cross-section and circular configuration and cut it to length by the use of a flying cut-off device. That is, the cut-off device would move with the same speed as the moving band to cut it at the desired location. An alternate method was by cutting bands on a separate cut-off machine not part of the forming machine. The welding or joining of the connecting members to the ends of the cut ring was carried out in a separate machine. This prior art approach had several disadvantages. First, it was difficult to properly control movement of the flying cut-off so that the resulting band members had exactly the right length. Further, even in those machines wherein the control was adequate, it was not possible to perform the welding operations simultaneously with the band forming. Thus, the bands had to be transferred to a separate welding machine where the welding could take place. This resulted in additional handling of the parts and a somewhat lower rate of production than desirable.

The subject invention overcomes the above problems and provides a machine wherein forming, cutting and welding take place in a single apparatus through which the formed bands are moved with an index movement. Additionally, the subject apparatus combines both the cutting and welding operations at a single station so that the end connector at the trailing end of one band is simultaneously welded at the time the leading connector of the following band is welded. Further, the cutting function is performed intermediate the two welding stations substantially with the welding. Thus, welding and cutting are closely controlled so that the cut takes place exactly at the right point relative to the two welding operations. This is a distinct advantage over the prior separate cutting and welding operations.

The invention also contemplates that the control of the apparatus takes place with pairs of electric eyes which sense the approach to the proper point of the band and slow the operation of the machines so that the final pair of electric eyes give a complete stop which then stops the machine precisely at the desired location. This allows substantially increased rate of feed throughout the major portion of the cycle and allows a stepped stopping for precise locating.

Accordingly, a primary object of the invention is the provision of a ring forming machine wherein cutting of the ring and attachment of the ring connecting members take place at a single location.

Yet another object of the invention is the provision of a forming machine of the general type described in which a single cutting head is positioned between a pair of reciprocated weld heads which act to simultaneously join connecting members to the ring at points on opposite sides of the cutting head.

A still further object of the invention is the provision of a machine of the general type described wherein forming takes place through the use of pinch rolls adapted to continuously deform a strip into a coil shape after which a cutting and welding assembly serves to cut the formed strip into circular lengths and simultaneously attach connecting members to the ends of the ring.

The above and other objects and advantages will become apparent from the following description when read in conjunction with the accompanying drawings wherein:

FIG. 9 is a cross-sectional view taken on line 9—9 of FIG. 8; and,

Figure 1:
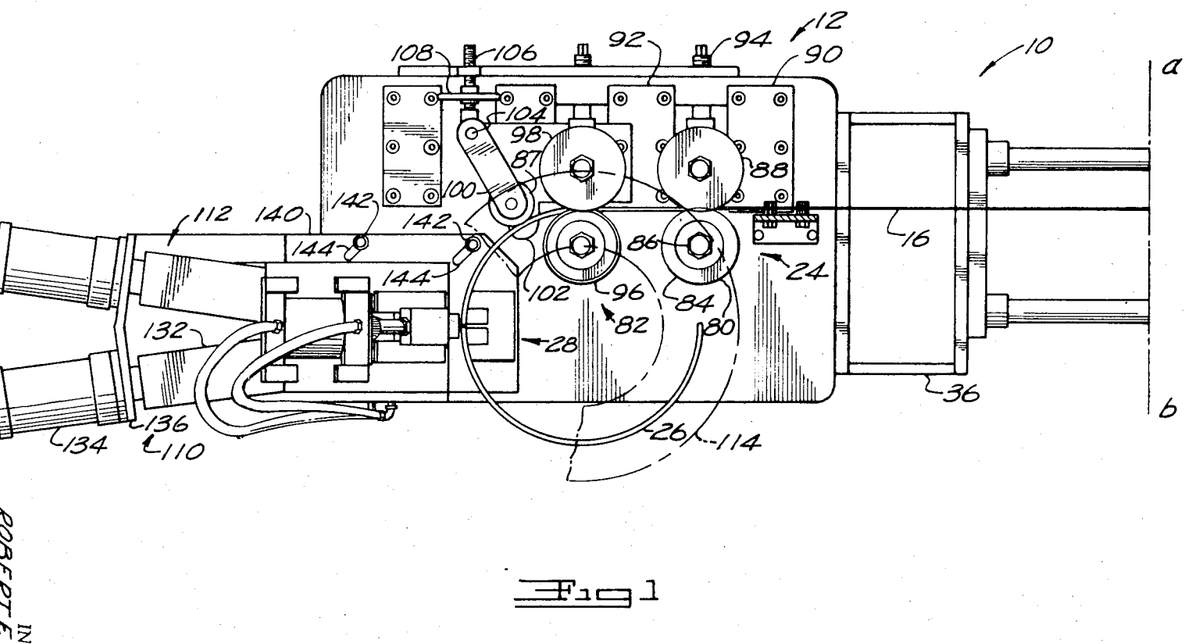
FIGS. 1 and 2 are plan views which join along lines aa and bb to show a machine formed in accordance with a preferred embodiment of the invention.
Figure 2:
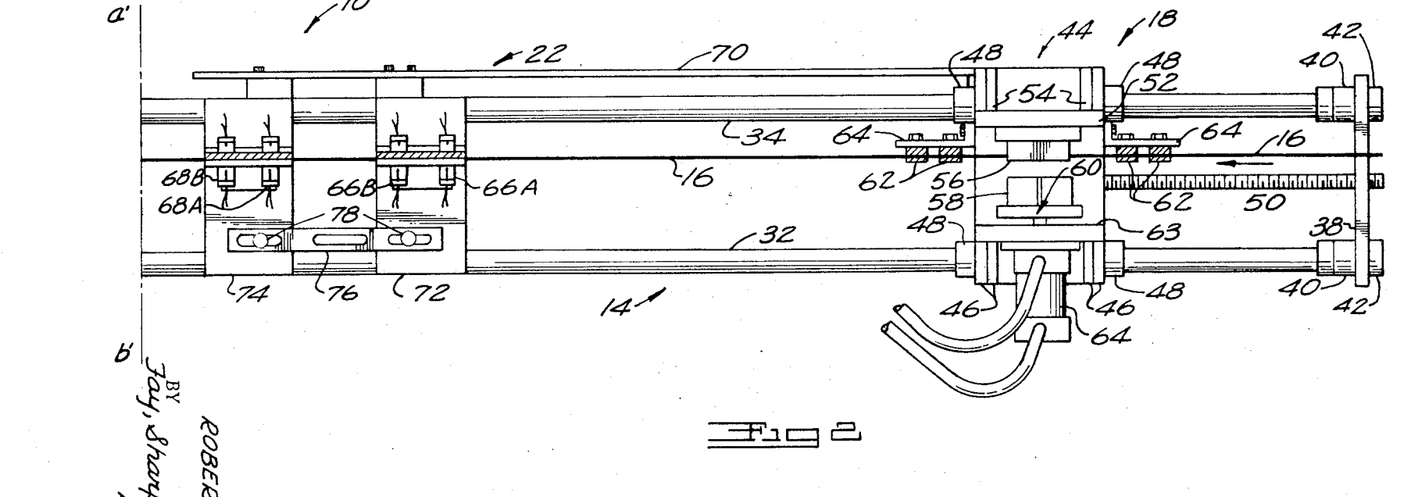

Referring more particularly to the drawings wherein the showings are for the purpose of illustrating a preferred embodiment of the invention only, and not for the purpose of limiting same, FIGS. 1 and 2 show the overall arrangement of the apparatus comprising a horizontally, elongated frame assembly 10 including a drive housing portion 12 and a band guiding and control supporting portion 14. The apparatus is arranged to take a continuous, flat strip or band of metal 16 (which is supplied to the right-hand end of the machine as viewed in FIG. 2) from any convenient source, and form the strip into a plurality of metal rings or band members of the type used for attaching covers to the ends of shipping drums and the like.

Figure 3:
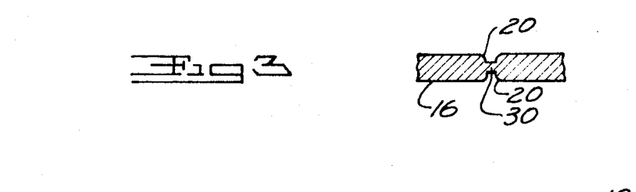
FIG. 3 is a detailed view showing the metal ring forming band after it has passed through a first cutting station in the machine and prior to the time it is cut into the individual ring sections.

In the embodiment under consideration, the strip or band 16 is passed through a first cutting station 18 which, as best shown in FIG. 3, cuts a pair of inwardly extending recesses into the opposite sides of the strip. The recesses 20 serve to actuate further functioning of the machine by being directed through an electric eye-type sensing station 22 positioned immediately ahead of the forming station 24. Further, the narrow band between the recesses is cut after the final forming operation to separate the band into the individual ring sections.

As the strip 16 passes through the forming station 24, it is deformed into a ring 26 having a generally U-shaped cross-section Thereafter, at the welding and cutting station 28, the necessary band connecting members are welded to the formed ring on opposite sides of the recesses 20. At the same station, a shear acts to cut through the web portion 30 between the recesses 20 thereby separating the strip into individual rings. The preferred form of construction for each of the above mentioned components will subsequently be described in detail; however, for the present, it is sufficient to note that the continuous metal strip 16 is intermittently moved through the apparatus during the forming of the ring members. The movement is controlled so that exactly the right length of strip is provided to form a continuous, circular connecting band. As previously mentioned, the recesses 20 serve to actuate the machine at the proper time for the welding and cutting operations. Referring in more detail to each of the components of the assembly, the frame assembly 10 will first be described.

Frame Assembly 10

The frame assembly 10 includes a first, generally rectangular drive housing section 12 which is formed from metal plate or the like and supports the drive and drive frame for the forming unit 24. Connected to the drive housing section 12 and extending to the right therefrom, is an elongated guideway forming section 14. The guideway forming section 14 includes a pair of cylindrical rods 32 and 34 which extend parallel to one another horizontally at section 12. It will be noted that the left-hand end of rods or shafts 32, 34 are joined to frame section 12 by generally rectangular frame 36 formed from welded plates. At the right-hand end of the bars 32, 34, a spacer plate 38 is connected to the bar by suitable collars 40 and 42. Although not shown, the spacer plate 38 is supported by suitable legs which extend downwardly therefrom.

Cutting Station 18

The cutting station 18 is adjustably mounted on the horizontal shafts 32, 34 and comprises a rectangular base or frame 44 having suitable vertical plate sections 46 extending downwardly from its lateral edges and carrying guide sleeves 48 which encircle the shafts 32, 34. The entire first cutting assembly, as well as the electric eye assembly 22, is adjustable relative to the frame section 14 and, for this purpose, a screw shaft 50 extends through the spacer member 38 and engages in a suitable threaded opening carried on the frame 44. A hand crank or the like allows rotation of shaft 50 for adjustment of the longitudinal position of the cutting assembly 18 on the electric eye assembly 22.

The details of the cutting assembly 18 are not of particular importance to the invention but, in the embodiment shown, comprise a vertically extending plate or frame member 52 which is connected to the top surface of plate 44 and suitably braces by angle members 54. A first cutter die half 56 is carried from the vertical plate 52. The die half 56 is a male die half and arranged to cooperate with the female die half 58 so as to produce the cut shown in FIG. 3. The female die half 58 is carried on a piston rod 60 which is slidably supported in a plate 63. A fluid piston 64 is carried on the opposite side of the plate and supplied with actuating fluid at the proper times to drive the die halves together to form the necessary cut.

Additionally, the movement of strip 16 through the cutting assembly 18 is preferably guided by pairs of rollers 62 positioned to engage opposite edges of the strip and maintain it centered relative to the cutting dies. It will be noted that the rollers 62 are suitably supported from brackets 64 extending laterally from the support plate 52.

Electric Eye Assemblies 10 & 22

As previously mentioned, the electric eye assemblies 10 and 22 are moved simultaneously with the first cutting assembly 18. The distance between the electric eye assembly and the cutting assembly is controlled so as to produce a band having exactly the right length for the rings being made.

In the embodiment under consideration, electric eye assemblies 10 and 22 include two sets each of electric eye units 66 and 68 which are arranged to control energization of the forming and drive section 24 to cause proper indexing movement of the strip or band 16 through the unit. The control sequence will subsequently be described; however, for present purposes, it is sufficient to note that the band 16 passes through or between the sections of the eyes and the recesses 20 formed in the band serve to actuate the eyes. Note that the assemblies 10 and 22 are connected to the first cutter assembly 18 by a bar or rod member 70 for simultaneous movement therewith. Further, each of the sets of electric eyes 66 and 68 are carried on separate transversely extending plates 72 and 74, respectively. Suitable guide members (not shown) extend downwardly from the undersurface of the plates 72, 74 for engagement with the shafts 32, 34. Additionally, a spacer bar 76 extends between the lower ends of the plates as viewed in FIG. 2 and is connected to each plate by suitable machine screws or the like 78. It should be noted that the bar 76 is provided with elongated slots so that fine adjustments can be made in the spacing between the two sets of electric eyes.

Drive and Forming Section Assembly 24

The drive and forming section assembly 24 is arranged to take the flat band 16 and deform its cross-section to a generally U-shaped configuration and simultaneously cause it to curve to the circular shape shown. The forming and drive section 24 includes two sets of forming rolls 80 and 82. The first set 80 partially deform the cross-section whereas the second set finishes the cross-sectional deformation and, in combination with the roll 87, imparts the necessary circular configuration to the band.

The first set of forming rolls 80 includes a driven roll 84 carried on a vertically extending drive shaft 86. The outer periphery of the roll 84 is of generally semicircular cross-section and arranged to mate with a similarly shaped recess in the edge of roll 88. Roll 88 is mounted for adjustment so as to vary the spacing between its periphery and the periphery of roll 84. The mounting could be of many types but it is shown as a simple grooved hub which is engaged by the plates 90, 92. An adjusting screw 94 extends through the side of the base frame 12 and engages the bearing of roll 88.

Roll set 82 is basically identical to the previously discussed roll set 80; however, the outer periphery of the rolls is shaped to conform to the final desired cross-section for the band 16. In this group, roll 96 is driven simultaneously with roll 84 and roll 98 is mounted for adjustment in the same manner as roll 88.

Positioned immediately after the roll set 82 is the previously mentioned roll 87. Roll 87 is a relatively small diameter roll positioned so as to cause the band exiting from between roll set 82 to be deformed into the circular shape shown. Note that the position of roll 87 is adjustable so that the diameter of the resulting ring form can be varied. For this purpose, roll 87 is mounted in an arm 100 which has its lower end (as viewed in FIG. 1) engaged in a curved guide groove 102 and its upper end pivotally connected to an adjustable member 104. Note that member 104 is moved by a screw rod 106 carried in a suitable threaded opening and the frame assembly 12 and provided with an adjusting hand wheel 108. By adjusting hand wheel 108, the position of the roll 87 is shifted relative to the roll set 82.

The apparatus thus far described is somewhat conventional and could vary substantially from that as shown. In operation, the band is continually indexed through the forming heads and deformed into a circular spiral shape. At proper intervals, the band must be severed so as to form a succession of rings having opposed ends. The ends are provided with suitable, manually releasable connecting means. The connecting end portions allow the ends of the bands to be releasably connected and drawn together for attaching the covers to drums or the like.

Cutting and Welding Section 28

The overall arrangement of the welding and cutting head assembly 28 is best shown in FIGS. 1 and 4 through 7. Broadly, assembly 28 comprises a pair of welding head units 112 and 110 which are positioned to engage the formed ring and end connectors in the manner best shown in FIG. 8. As noted, each of the welding units is positioned to engage a separate end of the formed ring. Note that unit 112 engages the leading end of one ring wherein unit 110 engages the tail end portion of the next preceding ring. A suitable spiraled ring guide member 114 (shown dotted in FIG. 1) spirals the formed ring up away from the cutting and welding station so that it can be removed by the operator and will not interfere with the functioning of the machine.

Referring again to the welding head units 110 and 112, each of the two units is identical in construction but of opposite hand. Accordingly, only unit 110 will be described in detail but the descriptions are to be taken as equally applicable to unit 112. Basically, unit 110 includes a weld head member 116 having a terminal end 118 shaped to engage a substantial portion of the connecting member and made from any high conductivity metal such as copper. Member 116 is releasably connected in any convenient manner, such as through the use of machine screws 120, to a main conductor body 122. The conductor body 122 is carried on a slide member 124 in the manner best shown in FIGS. 7 and 8. As can be seen, conductor 122 is connected by machine screws 126 and suitably insulated from slide member 124 by insulating spacers 128. The slide member 124 is carried in a slideway comprising a pair of side plates 128 and 130, and a cover plate 132 which is releasably connected to the side plates.

The welding head is reciprocated by a double acting air piston 134 (see FIG. 1) carried from a vertically extending plate 136 and having its piston rod suitably connected to the outer end of slide member 124.

As best shown in FIG. 1, the welding and cutting assembly 28 is adjustably mounted relative to the frame 12 by being carried on a plate 140 which is connected to the frame 12 by machine scress 142. As can be seen, plate 140 is provided with elongated slots 144 through which the screws 142 pass. By releasing screws 142, the plate can be shifted to shift the position of the cutting and welding assembly and provides a fine adjustment of the unit relative to the formed ring 26.

Figure 7:
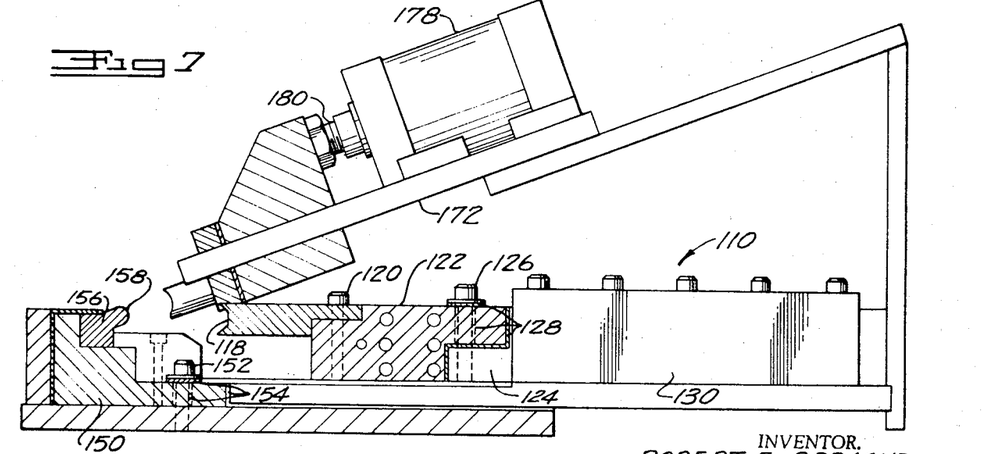
FIG. 7 is a partial elevational view showing the relationship between the cutting and welding heads of the assembly.

Arranged to cooperate with the movable electrodes 116 are contoured contact blocks 150 formed from copper or other high conductivity metal having desired wear properties. The blocks 150 are formed with the shape best shown in FIGS. 7 and 8. Note that they are removably connected in place by socket screws or the like 152 which are suitably insulated by insulating spacers 154. The blocks have a surface contoured to closely engage the connectors. As best shown in FIG. 7, the blocks have a replacement part 156 which has an outwardly extending nose portion 158 which is received within the shaped ring 28. The connector member, which is to be welded to the ends of the ring, is positioned over the ring by a feed assembly which will subsequently be described and thereafter, actuation of the welding heads causes the surface 118 to engage the ring and complete the circuit through to block 156 causing welding to take place between the ring 28 and the connector member.

Figure 4:
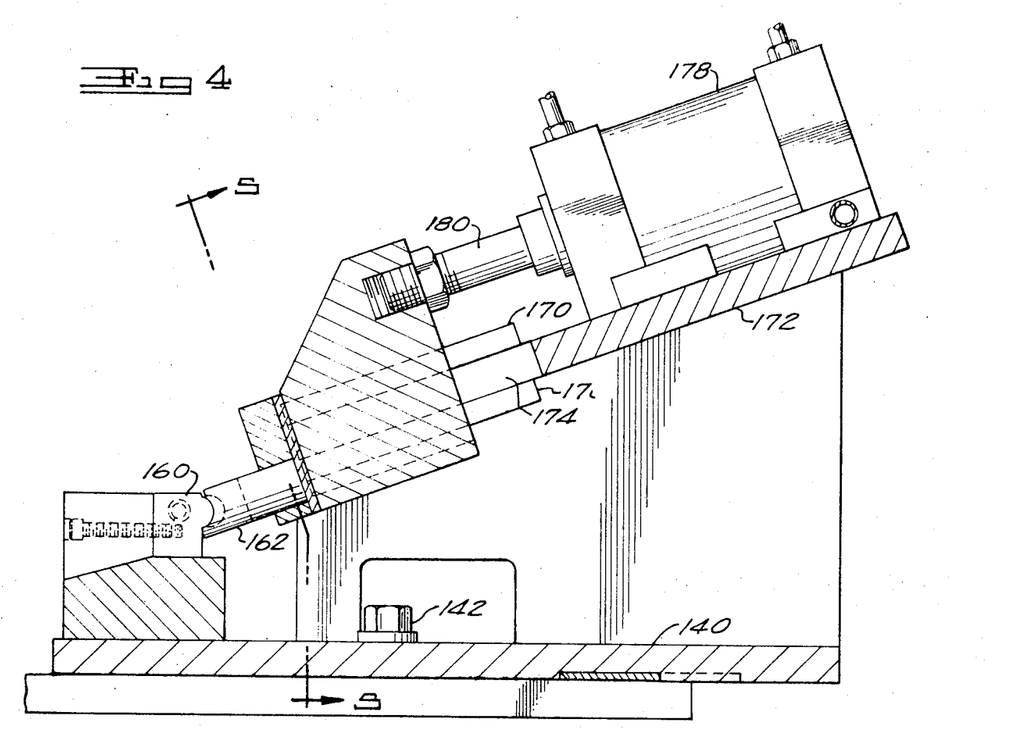
FIG. 4 is a cross-sectional view taken on line 4—4 of FIG. 1 and showing the cutting assembly used to cut the continuous strip or band into independent, formed rings.
Figure 5:
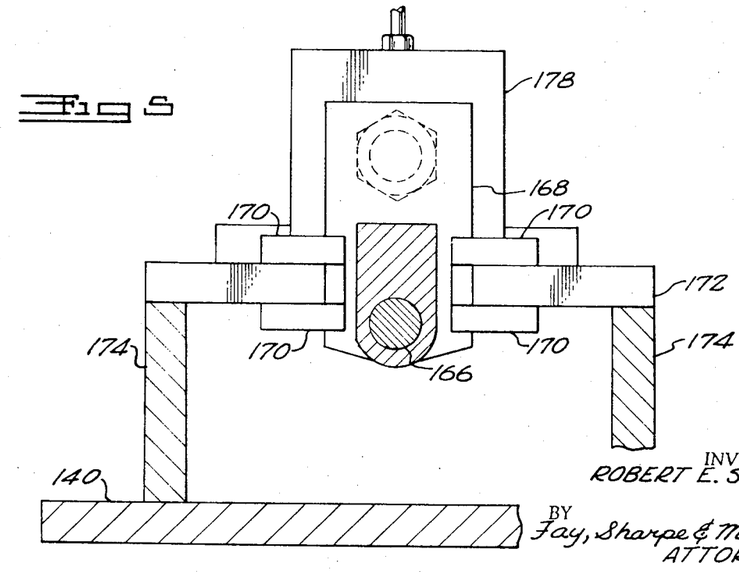
FIG. 5 is a cross-sectional view taken on line 5—5 of FIG. 4 to show the cutting assembly in more detail.
Figure 6:
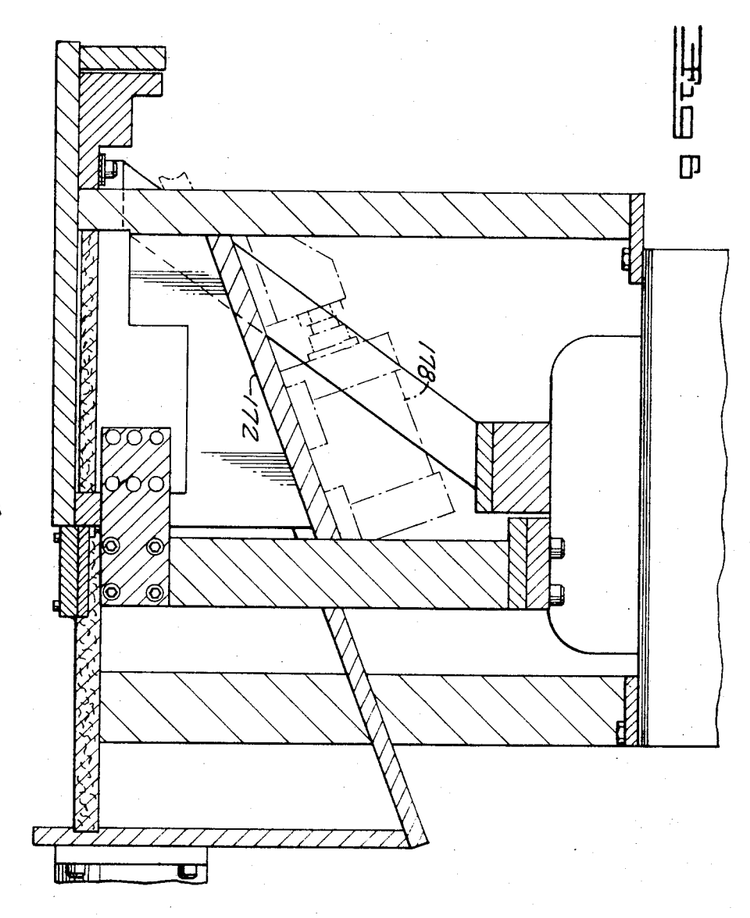
FIG. 6 is a cross-sectional view taken on line 6—6 of FIG. 1 but with the cutting and welding assembly of the apparatus removed to more clearly show the transformer support structures.
Figure 8:
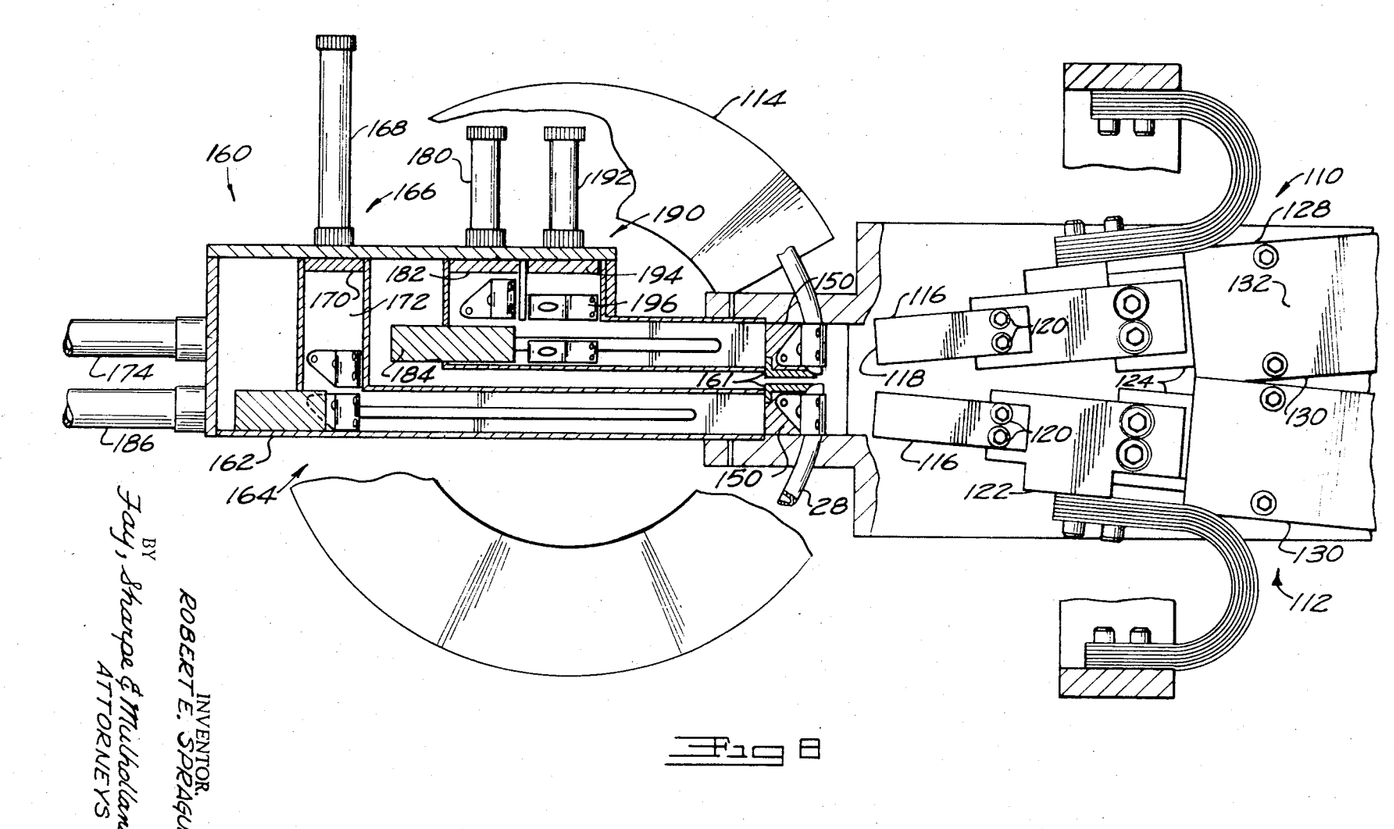
FIG. 8 is an enlarged plan view of the welding head and showing the mechanism used to feed the connector members into position for welding.

As best shown in FIGS. 4 and 8, positioned between the blocks 150 are cutters 160 which cooperate with a reciprocated cutter 162 to shear the small connecting portion 30 (see FIG. 3). The cutter 162 is of a width to be closely received between the cutters 160. As best shown in FIGS. 4 through 7, the cutter 162 is moved reciprocatorily along a path between and above the welding heads 110 and 112. The cutter 162 is formed at the end of a cylindrical shaft 166 mounted in a slide block 168. The block is provided with outwardly extending guide portions 170 which engage the upper and lower surfaces of a support plate 172. A slot 174 is formed in the plate 172 and forms a guideway for the slide block 168. It should be noted that the support plate 172 is supported from the pair of side plates 174 which are connected to the base plate 140. Means for reciprocating the cutter comprises a double acting fluid cylinder 178 carried on the plate 172 and having its piston rod 180 threadedly connected to the slide block 168 as shown in FIG. 4.

The means for feeding the end or connector members to their location for attachment to the band 28 is best shown in FIGS. 8 and 9. Broadly, it is a reciprocated feed assembly identified by the numeral 160 and including means for reciprocating the end connectors from a supply station to the proper location at the welding station. In the embodiment shown, the means comprise a generally rectangular metal frame 162 positioned directly opposite the welding and cutting station and including a first reciprocating feeder 164 including a push member 166 best shown in FIG. 9. The end connectors are supplied to the position shown in FIG. 9 from a feed unit 166. The feed unit 166 comprises an air cylinder 168 mounted at the side of the frame 162 and having its piston rod connected through the frame to a push member 170. The parts are supplied from a gravity feed duct (not shown) to the dotted line position of FIG. 8. Thereafter, actuation of the cylinder 168 pushes the parts along the guide groove 172 onto the formed end of the push member 166 shown in FIG. 9. Thereafter, push member 166 is advanced by an air cylinder 174 causing the parts to be moved along the guide groove 176 to a position over the corresponding welding block 150. Thereafter, actuation of welding head assembly 112 can take place to weld the connector to the band. The means for supplying the opposite connector to the immediately preceding band end comprises a similarly arranged pair of pusher members including a supply pusher air cylinder 180 having a rectangular pusher plate 182. Pusher plate 182 is arranged to engage the end connectors fed by gravity to the solid line location shown in FIG. 8 and advance them to a lateral pusher 184 shown in a side elevation in FIG. 9. The pusher 184 is actuated by an air cylinder 186 to advance the end connector to its final location over the band and on the corresponding welding block 150.

It should be noted that the pusher members 166 and 184 are guided by corresponding slots formed through a frame plate 186. If desired, other forms of feeding means could be utilized to supply the parts to the desired location over the band and on the welding heads.

In the embodiment under consideration, a second lateral feed unit 190 is associated with the push member 184 so that an alternate form of part can be supplied to the second weld head station if desired. Basically, this assembly 190 is the same as the main lateral pusher for the unit and merely comprises an air cylinder 192 having its piston rod connected with a push plate 194. The parts identified by the numeral 196 are gravity fed to the solid line position shown in FIG. 8 for lateral movement to supply pusher 184.

If desired, many modifications can be made in the basic arrangement of the welding and cutting heads; however, it is important that all welding and cutting take place at a single station so that further indexing movement of the band is not required. It is important to note that the cutting members 160 are built directly into the contact or backup welding blocks 150. This eliminates any alternate or additional stations and simplifies control of the machine. Note that each time the forming portion of the machine is stopped, all welding and cutting is taken care of simultaneously. This eliminates precision stopping problems required if cutting takes place after the welding. If cutting is not done at the same station, extreme difficulties are encountered in precisely stopping the band at a location such that the cutters will not inadvertently be actuated into a portion of the formed end piece.

Figure 10:
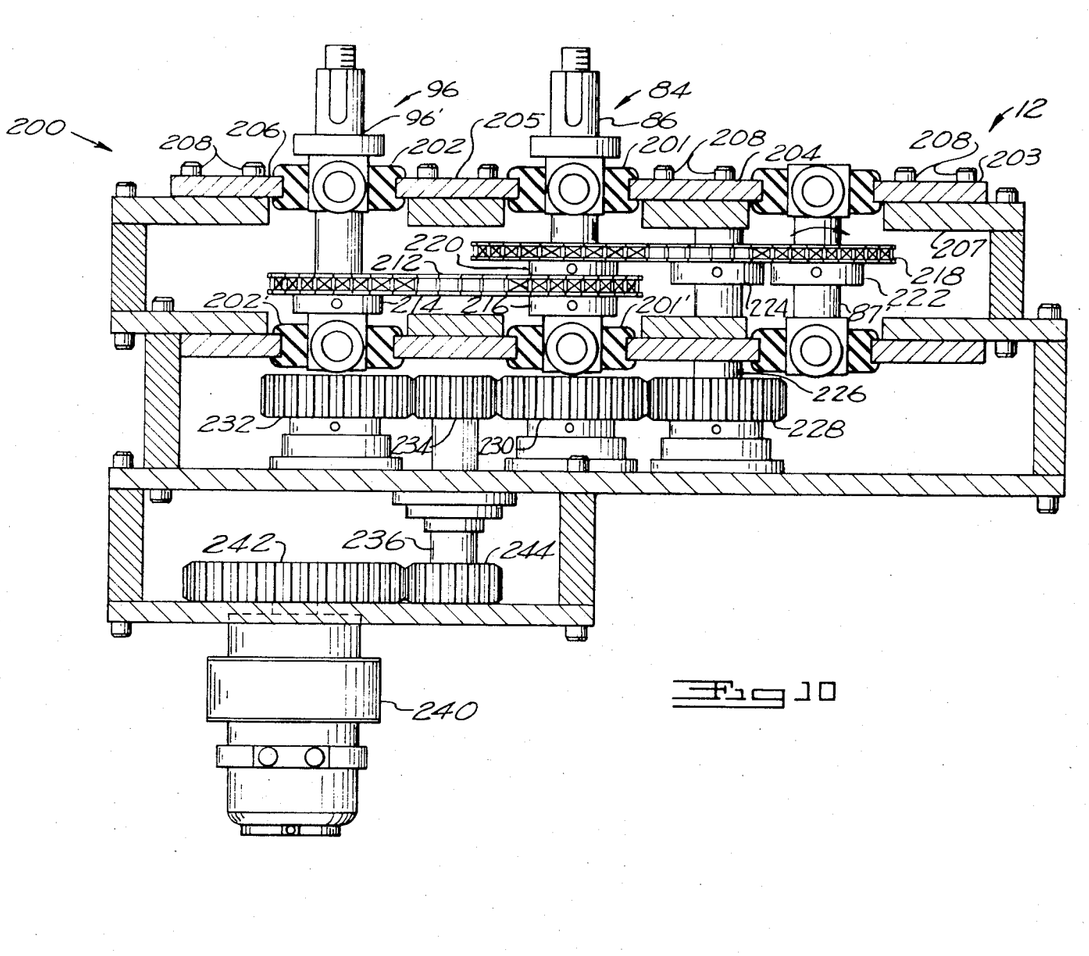
FIG. 10 is a cross-sectional view taken on line 10—10 of FIG. 1.

The drive train section for the forming roll units is preferably formed as shown in FIG. 10. As illustrated in FIG. 10, the drive shafts for rolls 84 and 96 are identified by the numerals 84' and 96', respectively. Each of the drive shafts is carried in a suitable slide block 201 and 202, respectively. The slide blocks are engaged by plates 203 through 206 which are connected to the top plate 207 of the drive housing 12 by suitable machine screws or socket screws 208. As shown, the plates 203 through 206 engage correspondingly sized grooves or slots formed in opposite sides of the shaft bearing housings. This allows horizontal adjustment of the rolls to be accomplished by the previously mentioned screws 94 and 106 which engage the tops of the bearings.

The shafts are also supported at their inner ends by similar bearings which are also mounted for horizontal adjustment in the manner described. Corresponding parts of the opposite shaft ends and the bearings have been identified by corresponding reference numerals differentiated by a prime (') suffix. Referring to the right-hand end of FIG. 10, it will be seen that the drive shaft for roll 87 is also mounted for horizontal adjustment and all three shafts 84', 96' and 87' are simultaneously driven through a chain drive comprising a first roller chain 212 connected between suitable sprockets 214 and 216 carried on shafts 96' and 84', respectively. Additionally, a second roller chain 218 is connected through sprockets 220 and 222 with shafts 84' and 87'. The chain 218 is driven from a sprocket 224 carried on a rotatably mounted shaft 226 mounted at an elevation beneath the elevator shafts 84' and 96'. A gear 228 is connected to the lower end of shaft 226 (as viewed in FIG. 10). The gear 228 is driven from a gear 230 carried on the shaft for roll 84. A similar gear 232 is carried on the shaft for roll 96 and both gears 232 and 230 are driven simultaneously by a drive gear 234 carried at the upper end of stub shaft 236. A hydraulic motor 240 is drivingly connected with shaft 236 by a main gear 242 and a smaller gear 244. As can be appreciated, hydraulic motor 240 and the described drive train causes all shafts for the forming rolls to be simultaneously driven in the proper direction for feeding the strip through the unit.

The hydraulic motor 240 is controlled in response to the electric eye sensing units 10 and 22 to stop and start the proper timed relationship with the cutting and welding operation.

The invention has been described in great detail sufficient to enable one of ordinary skill in the cutting and welding art to make and use the same. Obviously, modifications and alterations of the preferred embodiment will occur upon a reading and understanding of the specification and it is my intention to include all such modifications and alterations as part of my invention insofar as they come within the scope of the appended claims.

What is claimed is:

1. A cutting and welding apparatus for forming metal drum closure bands comprising:

first means for deforming an elongated metal band such that it has a generally U-shaped cross-section in planes perpendicular to its longitudinal axis;

second means associated with said first means for receiving the deformed band from said first means and forming it into a ring wherein the U-shaped cross-section opens radially inwardly;

a welding and cutting assembly including a pair of welding heads mounted for movement toward and away from said band to engage said band at closely spaced points for welding band connecting means thereto, a cutting member positioned between said welding heads and adapted to sever said band following a welding operation; and, means for selectively moving said welding heads including means responsive to movement of said band for actuating said welding heads.

2. A cutting and welding apparatus as defined in claim 1 including means for feeding band connecting members to a position between said band and said welding heads.

3. The apparatus of claim 1 wherein said cutting means is mounted for reciprocation between said welding heads and is arranged for operation intermittently with said welding heads.

4. The apparatus of claim 1 wherein said welding heads each operate simultaneously only when said band is stationary.

5. The apparatus of claim 1 wherein said welding and cutting assembly is mounted for adjustment relative to said band.

6. The welding and cutting assembly of claim 1 including fluid power means for reciprocating said welding heads and said cutting means.

* * * * *